US010042227B2

(12) United States Patent
Huang

(10) Patent No.: US 10,042,227 B2
(45) Date of Patent: Aug. 7, 2018

(54) CAMERA AND ELECTRONIC DEVICE

(71) Applicants: BOE TECHNOLOGY GROUP CO., LTD., Beijing (CN); BEIJING BOE VISION-ELECTRONIC TECHNOLOGY CO., LTD., Beijing (CN)

(72) Inventor: Wei Huang, Beijing (CN)

(73) Assignees: BOE TECHNOLOGY GROUP CO., LTD., Beijing (CN); BEIJING BOE VISION-ELECTRONIC TECHNOLOGY CO., LTD., Beijing (CN)

( * ) Notice: Subject to any disclaimer, the term of this patent is extended or adjusted under 35 U.S.C. 154(b) by 221 days.

(21) Appl. No.: 14/409,065

(22) PCT Filed: Jun. 30, 2014

(86) PCT No.: PCT/CN2014/081243

§ 371 (c)(1),
(2) Date: Dec. 18, 2014

(87) PCT Pub. No.: WO2015/062299

PCT Pub. Date: May 7, 2015

(65) Prior Publication Data

US 2016/0266418 A1 Sep. 15, 2016

(30) Foreign Application Priority Data

Nov. 1, 2013 (CN) .......................... 2013 1 0535771

(51) Int. Cl.

*G02F 1/137* (2006.01)
*H04N 5/225* (2006.01)

(Continued)

(52) U.S. Cl.

CPC ............ *G02F 1/137* (2013.01); *G02F 1/1334* (2013.01); *G03B 9/00* (2013.01); *G03B 11/00* (2013.01);

(Continued)

(58) Field of Classification Search

CPC ............ G02B 2027/014; G02B 27/017; G02B 27/0172; G02B 27/2228; G02B 27/2264;

(Continued)

(56) References Cited

U.S. PATENT DOCUMENTS 6,626,532 B1 * 9/2003 Nishioka ................ G02C 7/083 351/41
2005/0259159 A1 * 11/2005 Horimai ............. G02B 27/2271 348/222.1

(Continued)

FOREIGN PATENT DOCUMENTS

CN 201035290 Y 3/2008
CN 101963826 A 2/2011

(Continued)

OTHER PUBLICATIONS

International Preliminary Report on Patentability dated May 3, 2016; PCT/CN2014/081243.

(Continued)

*Primary Examiner* — Trung Diep
(74) *Attorney, Agent, or Firm* — Ladas & Parry LLP

(57) ABSTRACT

Provided are a camera and an electronic device. The camera comprises a camera body (1) and an electrically-controlled liquid crystal light-adjusting layer (13), wherein a lens (11) is provided in the camera body (1), and the electrically-controlled liquid crystal light-adjusting layer (13) is correspondingly arranged outside the lens (11) and configured to allow the lens (11) to receive outside light through the electrically-controlled liquid crystal light-adjusting layer (Continued)

16 15 12 12 13 1 14

(13); the electrically-controlled liquid crystal light-adjusting layer (13) is electrically connected to the camera body (1) through a switch (14). In the camera provided by embodiments of the present disclosure, an electrically-controlled liquid crystal light-adjusting layer (13) is provided on the front of the lens (11); in a case in which the electrically-controlled liquid crystal light-adjusting layer (13) is turned off, it is not possible to take pictures even if the camera (1) is manipulated by a hacker or a trojan-horse program. Therefore, it can prevent surreptitious photo-taking performed by lawbreakers using the camera, protect the user's rights, and avoid damage to the user.

9 Claims, 3 Drawing Sheets

(51) Int. Cl.

| | |
|---|---|
| ***G03B 9/00*** | (2006.01) |
| ***G03B 11/00*** | (2006.01) |
| ***G03B 11/04*** | (2006.01) |
| ***G02F 1/1334*** | (2006.01) |
| ***G06F 21/56*** | (2013.01) |
| ***G06F 21/62*** | (2013.01) |
| ***H04N 5/232*** | (2006.01) |
| ***G06F 1/16*** | (2006.01) |

(52) U.S. Cl.

CPC ............ *G03B 11/04* (2013.01); *G06F 1/1605* (2013.01); *G06F 1/1686* (2013.01); *G06F 21/566* (2013.01); *G06F 21/6245* (2013.01); *H04N 5/225* (2013.01); *H04N 5/2254* (2013.01); *H04N 5/23245* (2013.01); *G06F 2200/1612* (2013.01)

(58) Field of Classification Search

CPC .......... G02B 7/102; G02C 7/00; G02C 7/101; H04N 13/026; H04N 13/0429; H04N 13/0431; H04N 13/0434; H04N 13/0438; H04N 13/0454

See application file for complete search history.

(56) References Cited

U.S. PATENT DOCUMENTS

| | | | | |
|---|---|---|---|---|
| 2006/0023278 | A1* | 2/2006 | Nishioka | G02B 5/32 359/15 |
| 2008/0266773 | A1 | 10/2008 | Szolyga et al. | |
| 2009/0322861 | A1* | 12/2009 | Jacobs | G02B 26/026 348/53 |
| 2011/0249230 | A1* | 10/2011 | Blum | G02C 7/083 351/47 |
| 2012/0079587 | A1* | 3/2012 | Peng | H04N 5/23293 726/17 |
| 2012/0258773 | A1 | 10/2012 | Alvarez et al. | |

FOREIGN PATENT DOCUMENTS

| | | | |
|---|---|---|---|
| CN | 101980099 | A | 2/2011 |
| CN | 201857872 | U | 6/2011 |
| CN | 102346991 | A | 2/2012 |
| CN | 202257374 | U | 5/2012 |
| CN | 202406191 | U | 8/2012 |
| CN | 203038159 | U | 7/2013 |
| CN | 203117861 | U | 8/2013 |
| CN | 203231265 | U | 10/2013 |
| CN | 103533225 | A | 1/2014 |
| TW | 201250574 | A | 12/2012 |

OTHER PUBLICATIONS

Second Chinese Office Action dated Jun. 3, 2016; Appln. No. 201310535771.6.

International Search Report Appln. No. PCT/CN2014/081243; dated Sep. 5, 2014.

First Chinese Office Action dated Feb. 3, 2016; Appln. No. 20130535771.6.

* cited by examiner

CAMERA AND ELECTRONIC DEVICE

TECHNICAL FIELD OF THE DISCLOSURE

The present disclosure relates to the field of electronic accessories for computer, and in particular, to a camera and an electronic device.

BACKGROUND

In daily life, there are some electronic products with a camera, such as various computers, cell phones, and so on. No protection device is provided for the camera of these electronic products. When frequently exchanging data mutually through mobile memory devices, our electronic products may probably be infected with trojan-horse viruses. Or, on the internet, some people intendedly distribute some trojan-horse viruses. Therefore, after someone takes control of the computer by means of the Trojan-horse virus, he may perform illegal activities such as surreptitious photo-taking, thus impairing the user's rights and causing the psychological damage to the user.

SUMMARY

Embodiments of the present disclosure provide a camera preventing surreptitious photo-taking and an electronic device provided with such a camera.

According to an embodiment of the present disclosure, there is provided a camera comprising a camera body and an electrically-controlled liquid crystal light-adjusting layer, wherein a lens is provided in the camera body, the electrically-controlled liquid crystal light-adjusting layer is correspondingly arranged outside the lens, and the electrically-controlled liquid crystal light-adjusting layer is electrically connected to the camera body through a switch.

Optionally, the electrically-controlled liquid crystal light-adjusting layer is made of Polymer Dispersed Liquid Crystal (PDLC).

Optionally, an indication lamp is provided in the camera body, and the indication lamp is connected to the electrically-controlled liquid crystal light-adjusting layer for indicating the operational state of the electrically-controlled liquid crystal light-adjusting layer.

Optionally, a mounting rack is provided in the camera body, and the lens and the electrically-controlled liquid crystal light-adjusting layer are both arranged on the front surface of the mounting rack.

Further, the mounting rack has fixing holes respectively on its two ends.

Optionally, the switch is arranged at an edge position of one side of the camera body, and a manual button is provided in the switch to control the ON and OFF of the switch.

An embodiment of the present disclosure further provides an electronic device comprising the camera described above.

In the camera provided by embodiments of the present disclosure, an electrically-controlled liquid crystal light-adjusting layer is provided on the front of the lens; in a case in which the electrically-controlled liquid crystal light-adjusting layer is turned off, it is impossible to take pictures even if the camera is manipulated by a hacker or a trojan-horse program. Therefore, it can prevent surreptitious photo-taking performed by the lawbreakers using the camera, and protect the user's rights, and avoid damage to the user.

In the figures, a list of elements represented by reference symbols is as follows:

1 camera body, 11 lens, 12 fixing hole, 13 electrically-controlled liquid crystal light-adjusting layer, 14 switch, 15 indication lamp, 16 mounting rack, 3 mounting frame, 31 light-passing hole, 32 groove, 33 fixing pillar, 34 open hole of mounting frame

DETAILED DESCRIPTION

In the following, specific implementations of embodiments of the present disclosure will be described in detail in connection with the drawings.

Figure 3:
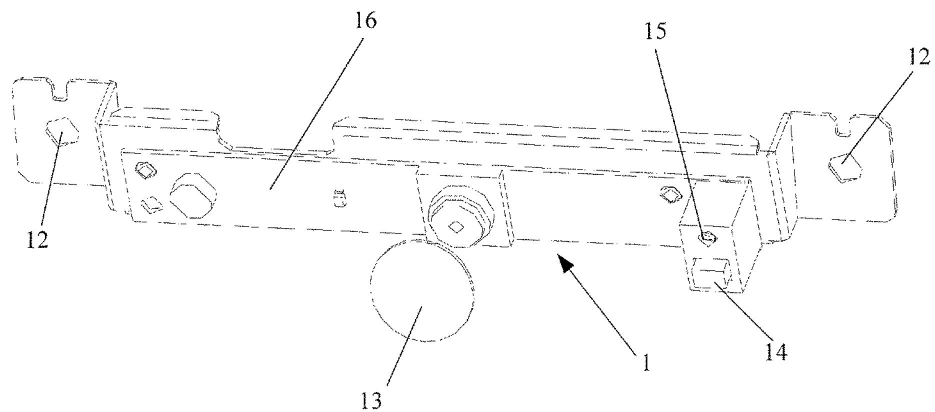
FIG. 3 is a structural diagram of a camera provided by an embodiment of the present disclosure.

As shown in FIG. 3, an embodiment of the present disclosure provides a camera. The camera comprises a camera body 1 and an electrically-controlled liquid crystal light-adjusting layer 13, wherein a lens 11 is provided in the camera body 1, and the electrically-controlled liquid crystal light-adjusting layer 13 is correspondingly arranged outside the lens 11 to allow the lens 11 to receive the outside light through the electrically-controlled liquid crystal light-adjusting layer 13, and the electrically-controlled liquid crystal light-adjusting layer 13 is electrically connected to the camera body 1 through a switch 14. The electrically-controlled liquid crystal light-adjusting layer employs PDLC material. The PDLC material can be switched between transparency and non-transparency by an adjustment of voltage. The PDLC material is in a transparent state with being powered on, while the PDLC material is in a non-transparent state with being powered off. When the circuit of the electrically-controlled liquid crystal light-adjusting layer is powered on by the switch, the electrically-controlled liquid crystal light-adjusting layer is transparent, in such a case the camera can normally take pictures. When the electrically-controlled liquid crystal light-adjusting layer is powered off by the switch, the electrically-controlled liquid crystal light-adjusting layer is not transparent; therefore, even if the camera is illegally controlled to perform surreptitious photo-taking, the electrically-controlled liquid crystal light-adjusting layer is not transparent, which blocks the light to be captured by the camera, resulting in the effect of preventing surreptitious photo-taking.

Figure 1:
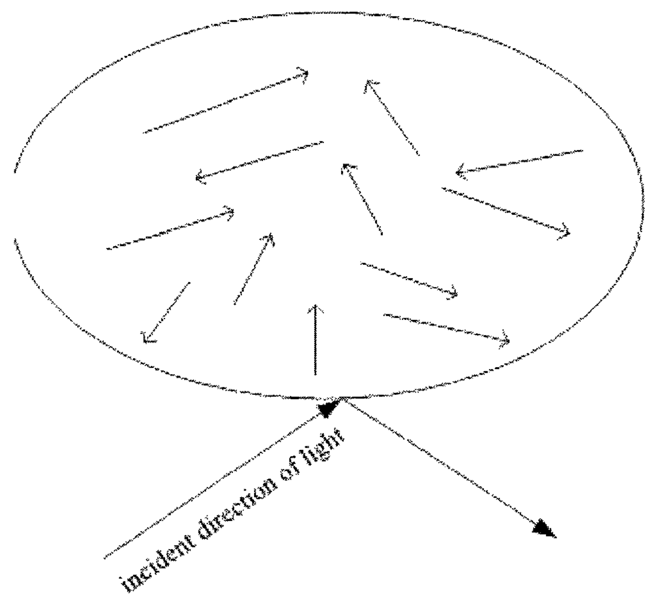
FIG. 1 is a schematic diagram illustrating the light transmission of the PDLC film without a voltage applied according to an embodiment of the present disclosure.
Figure 2:
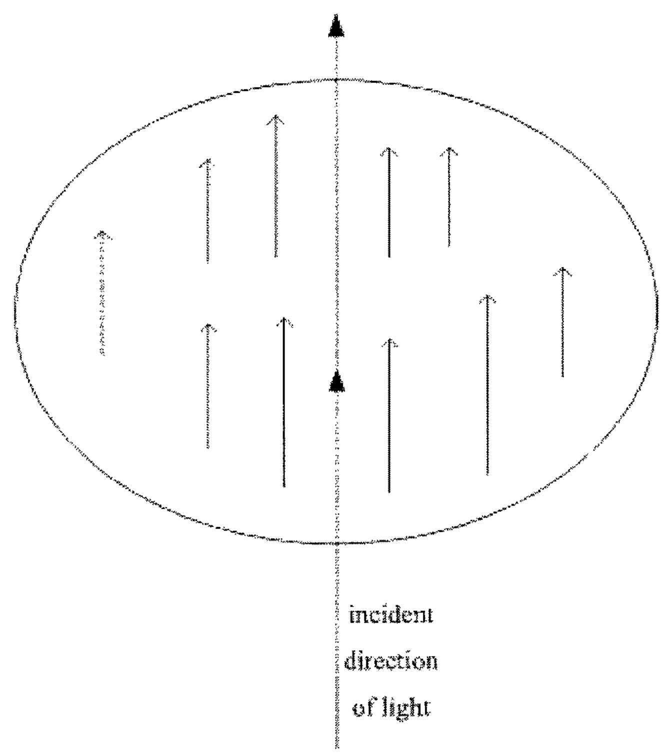
FIG. 2 is a schematic diagram illustrating the light transmission of the PDLC film with a voltage applied according to an embodiment of the present disclosure.

The principle of the PDLC is as follows. When there is no voltage is applied, as shown in FIG. 1, regular electric field cannot be formed in the PDLC film. The optical axes of liquid crystal particles are oriented randomly, presenting a random state. The incident light is scattered intensively, and the film presents a non-transparent state. If an external voltage is applied to the PDLC film, as shown in FIG. 2, the optical axes of the liquid crystal particles are aligned perpendicular to the surface of the film, that is, coincident with the direction of the electric field; therefore, the incident light will not be scattered, and the film presents a transparent state. As a result, the PDLC film has a light-switching characteristic under a driving of external electric field.

A manual button is provided in the switch 14 to control the ON and OFF of the switch 14, and the switch 14 is arranged at an edge position of one side of the camera body 1. Under a case in which the electronic device is manipulated by a trojan-horse software, if the switch employs an electronic switch such as a thyristor, an optoelectronic switch or the like, it can be easily manipulated by the trojan-horse software; therefore the effect of preventing surreptitious photo-taking cannot be achieved. Further, an indication lamp is provided in the camera body, and the indication lamp is connected to the electrically-controlled liquid crystal light-adjusting layer for indicating an operational state of the electrically-controlled liquid crystal light-adjusting layer. The indication lamp presents a light-on state, indicating that the switch is in the ON state. To the contrary, the indication lamp presents a light-off state, indicating that the electrically-controlled liquid crystal light-adjusting layer is not adjusted by a voltage, and the switch is in the OFF state.

As shown in FIG. 3, the camera body 1 comprises a mounting rack 16 on which the lens 11 is arranged. The fixing holes 12 are arranged on both sides of the lens 11 for mounting the camera. The electrically-controlled liquid crystal light-adjusting layer 13 is electrically connected to the camera body 1, and the switch 14 controls the ON and OFF of the electrical connection between the electrically-controlled liquid crystal light-adjusting layer 13 and the camera body 1. The indication lamp 15 indicates the ON and OFF the switch 14.

An embodiment of the present disclosure also provides an electronic device comprising a camera as described above. The electronic device can be a product provided with a camera, such as a computer, a cell phone, and so on.

Figure 4:
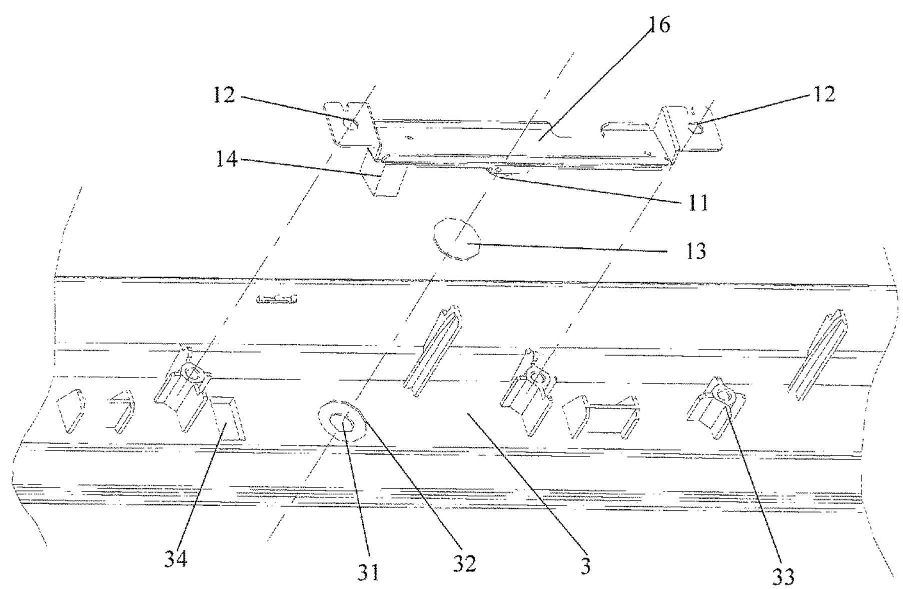
FIG. 4 is an exploded view of the detailed connection structure of the camera provided by an embodiment of the present disclosure.

For example, if the electronic device is an integrated personal computer, as shown in FIG. 4. The integrated personal computer comprises a mounting frame 3, and the camera body 1 can be fixed to fixing pillars 33 of the fixing frame 3 with fixing holes 12 through screws. The electrically-controlled liquid crystal light-adjusting layer 13 can be fixed in a groove 32 of the mounting frame 3, and a light-passing light hole 31 is provided in the groove 32. The switch 14 and the indication lamp 15 pass through an open hole 34 of the mounting frame.

Figure 5:
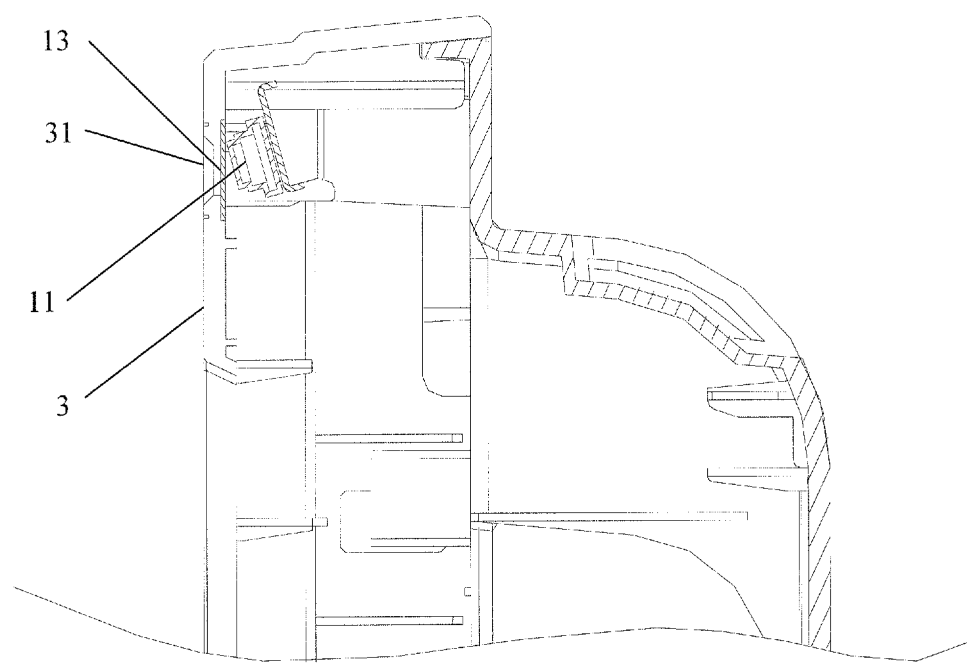
FIG. 5 is a mounting structure diagram of the camera according to an embodiment of the present disclosure.

The mounted camera is as shown in FIG. 5, wherein the electrically-controlled liquid crystal light-adjusting layer 13 is located in front of the lens 11 of the camera, and the electrically-controlled liquid crystal light-adjusting layer 13 blocks the light-passing hole 31.

When the user takes photos normally, the switch 14 is switched on to apply a voltage to the electrically-controlled liquid crystal light-adjusting layer 13, and the indication lamp 15 is in the light-on state. At this time, the user takes photos normally.

When the user switches off the switch 14, the indication lamp 15 becomes into a light-off state, and the camera stops operation. At this time, even if the camera is manipulated by a hacker, the lens 11 of the camera is blocked by the electrically-controlled liquid crystal light-adjusting layer 13 without a voltage applied. At this time, although the camera is manipulated by hacker, no pictures can be seen, and thus the effect of preventing surreptitious photo-taking through the camera can be achieved.

The above implementations are only for illustrating embodiments of the present disclosure, but not limiting the present disclosure in any way. Various modifications and variations can be made by those skilled in the art without departing from the spirit and scope of the present invention. Therefore, all equivalent technical solutions also fall in the scope of the present disclosure which should be defined by the claims.

The present application claims the priority of Chinese Patent Application No. 201310535771.6 filed on Nov. 1, 2013, and the entire content of which is incorporated as a part of the present application by reference.

What is claimed is:

1. A camera comprising a camera body and an electrically-controlled liquid crystal light-adjusting layer, wherein a lens is arranged in the camera body, the electrically-controlled liquid crystal light-adjusting layer is correspondingly arranged outside the lens, and the electrically-controlled liquid crystal light-adjusting layer is electrically connected to the camera body through a switch;

wherein the electrically-controlled liquid crystal light-adjusting layer is made of a polymer dispersed liquid crystal film;

if the electrically-controlled liquid crystal light-adjusting layer is powered on via the switch, the electrically-controlled liquid crystal light-adjusting layer is in a transparent status; otherwise, the electrically-controlled liquid crystal light-adjusting layer is in a non-transparent status;

wherein a manual button is arranged on the switch to control ON and OFF of the switch.

2. The camera according to claim 1, wherein an indication lamp is arranged in the camera body, the indication lamp is connected to the electrically-controlled liquid crystal light-adjusting layer for indicating an operational state of the electrically-controlled liquid crystal light-adjusting layer.

3. The camera according to claim 1, wherein a mounting rack is arranged in the camera body, and the lens and the electrically-controlled liquid crystal light-adjusting layer are both arranged on a front surface of the mounting rack.

4. The camera according to claim 3, wherein the mounting rack has fixing holes arranged respectively on two ends.

5. The camera according to claim 1, wherein the switch is arranged at an edge position of one side of the camera body.

6. An electronic device comprising a camera, wherein the camera comprises a camera body and an electrically-controlled liquid crystal light-adjusting layer, wherein a lens is arranged in the camera body, the electrically-controlled liquid crystal light-adjusting layer is correspondingly arranged outside the lens, and the electrically-controlled liquid crystal light-adjusting layer is electrically connected to the camera body through a switch;

wherein the electrically-controlled liquid crystal light-adjusting layer is made of a polymer dispersed liquid crystal film;

if the electrically-controlled liquid crystal light-adjusting layer is powered on via the switch, the electrically-controlled liquid crystal light-adjusting layer is in a transparent status; otherwise, the electrically-controlled liquid crystal light-adjusting layer is in a non-transparent status;

wherein a manual button is arranged on the switch to control ON and OFF of the switch.

7. The electronic device according to claim 6, wherein an indication lamp is arranged in the camera body, the indication lamp is connected to the electrically-controlled liquid crystal light-adjusting layer for indicating an operational state of the electrically-controlled liquid crystal light-adjusting layer.

8. The electronic device according to claim 6, wherein a mounting rack is arranged in the camera body, and the lens and the electrically-controlled liquid crystal light-adjusting layer are both arranged on a front surface of the mounting rack.

9. The electronic device according to claim 6, wherein the switch is arranged at an edge position of one side of the camera body.

* * * * *